R. J. BURROWS.
BRACKET.
APPLICATION FILED MAY 15, 1917.
1,314,502.
Patented Sept. 2, 1919.
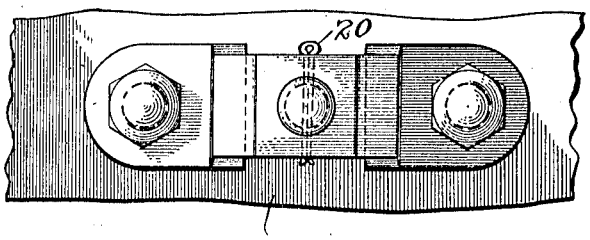
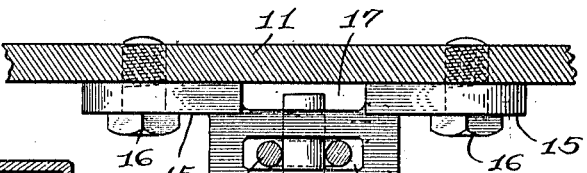
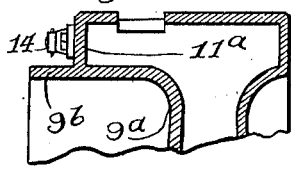
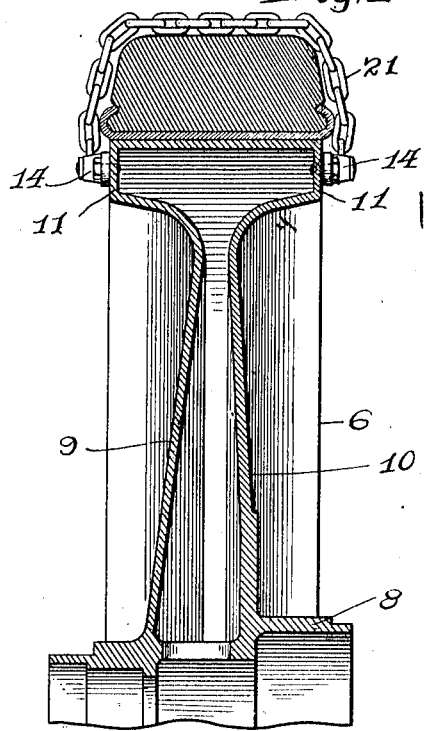
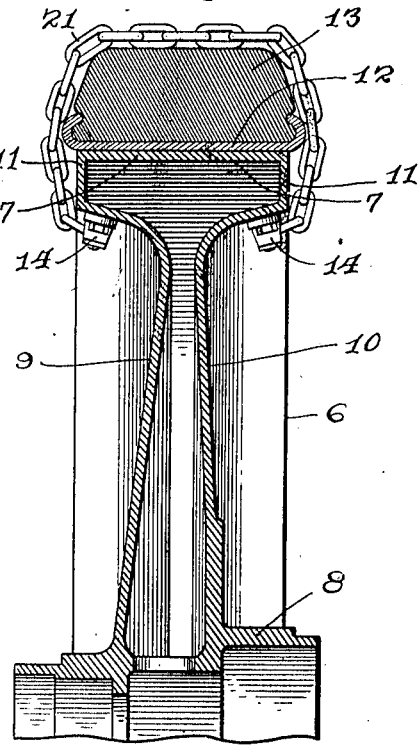

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

BRACKET.

1,314,502.  Specification of Letters Patent.  Patented Sept. 2, 1919.

Application filed May 15, 1917. Serial No. 168,672.

*To all whom it may concern:*

Be it known that I, ROBERT J. BURROWS, a citizen of the United States, and a resident of Buchanan, in the county of Berrien and State of Michigan, have invented certain new and useful Improvements in Brackets, of which the following is a specification, reference being had to the accompanying drawings.

My invention relates to brackets, and has primarily for its object to provide an improved bracket adapted for use in applying anti-skid chains to vehicle wheels, and particularly to heavy wheels such as are ordinarily used on trucks, although it may be used in many other situations. I accomplish this object as illustrated in the accompanying drawings and as hereinafter described. That which I believe to be new is set forth in the claims.

In the accompanying drawings,—

Figure 1 is an elevation of a part of the rim of a wheel having applied thereto one of the brackets by which the anti-skid chains are attached to the wheel;

Fig. 2 is a sectional view of a part of a wheel rim, showing my improved bracket in plan view;

Fig. 3 is a vertical section showing the upper half of a metal wheel of the type illustrated in Letters Patent No. 1,131,819 to myself and Edwin B. Ross, showing one of the anti-skid chains applied thereto by means of brackets like that shown in Figs. 1 and 2;

Fig. 4 is a similar view showing a different arrangement of the brackets; and

Fig. 5 is a partial sectional view of the rim of a different style of wheel, showing the brackets applied thereto, the tire and chain being omitted.

Referring to the drawings,—

6 indicates a wheel, which, in the example illustrated, is a metal wheel having a box-like rim 7, a hub 8, and webs 9—10 connecting the inner marginal portions of the side flanges 11 of the rim to the hub. It will be noted that the outer portions of said webs 9—10 are curved in opposite directions, their convex surfaces being toward the tread of the wheel. 12 indicates a separable rim mounted on the wheel and carrying a tire 13 which, in the construction illustrated, is solid.

14 indicates the brackets by which the ends of the anti-skid chains are secured to the wheel. As best shown in Figs. 1 and 2, each of said brackets is provided with oppositely-extending ears 15 perforated to receive bolts 16 by which the bracket is attached to the rim portion of the wheel, which is provided with threaded holes to receive the said bolts. As best shown in Fig. 2, said ears are offset with reference to the main portion of the bracket, forming a laterally open or exposed recess 17, so that when the bracket is applied to the wheel a space is left between the wheel and the intermediate portion of the bracket. 18 indicates a slot which extends laterally through the intermediate portion of the bracket 14 in a plane substantially parallel with that of the lugs 15. 19 indicates a pin which is adapted to be inserted in a hole which extends through the intermediate portion of the bracket 14 and intersects the slot 18. The pin 19 is of such length that when in position its inner end lies in the recess 17 between the intermediate portion of the bracket 14 and the wheel rim. The outer portion of the bracket 14 between the slot 18 and the outer surface of said bracket is bored to receive a cotter-pin 20 which passes through the pin 19 and serves to prevent it from dropping out accidentally. 21 indicates anti-skid chains which are applied to the wheel by means of the brackets 14. As best shown in Figs. 3 and 4, a pair of brackets 14 is used for the attachment of each chain 21, such brackets being secured at opposite sides of the wheel rim, and as many pairs of brackets being provided at different points around the wheel as may be desired. The chain is secured in position by inserting its end links in the slots 18 of one of the pairs of brackets and passing the pins 19 through such links, the pins being then secured by the cotter-pins 20. The chains may readily be detached by removing the pins 19. If for any reason a pin should be hard to remove, it may be forced out by driving a wedge between its inner end and the wheel rim, since the recess 17 being accessible laterally permits ready access to the inner end of the pin for that purpose.

As shown in Fig. 3, the brackets may either be attached to the webs 9—10 near their juncture with the vertical flanges 11 of the rim-structure, or they may be attached directly to the flanges 11 as shown in Figs. 4 and 5. The latter arrangement is peculiarly appropriate to a wheel such as that shown in Fig. 5 in which the inside web 9ª of the wheel is extended beyond the flange 11ª to which it is attached, as shown at 9ᵇ in said figure, as with such a wheel the chains 21 cannot extend over the projecting portion 9ᵇ.

By the construction described, I provide means by which any desired number of anti-skid chains may be readily applied to a wheel and as readily removed. The brackets also may be easily removed when occasion requires. While the brackets are primarily intended for use in securing anti-skid chains to wheels, they may be used for any other purpose for which they are adapted.

That which I claim as my invention, and desire to secure by Letters Patent, is,—

1. A bracket of the character described, comprising a member having means for securing it in operative position, and a slot adapted to receive a device to be secured, said member being perforated to receive a pin passing transversely through said slot and having an exposed recess into which the inner end of said pin may extend.

2. A bracket of the character described, comprising a member having oppositely-extending lugs for securing it in operative position, a laterally-extending slot adapted to receive a device to be secured, and an exposed recess at one side of said slot, said member being perforated for the passage of a pin transversely through said slot into said recess.

3. A bracket of the character described, comprising a member having oppositely-extending lugs for securing it in position, a laterally-extending slot adapted to receive a device to be secured, and an exposed recess in the inner face of the bracket between said lugs, said member being perforated for the passage of a pin transversely through said slot into said recess.

ROBERT J. BURROWS.

Copies of this patent may be obtained for five cents each, by addressing the "Commissioner of Patents, Washington, D. C."